United States Patent [19]

Lowe et al.

[11] Patent Number: 4,854,785

[45] Date of Patent: * Aug. 8, 1989

[54] SCALLOPED THREADER CUTTING INSERT

[75] Inventors: Tony Lowe, Royal Oak; Thomas Bernadic, Madison Hts., both of Mich.

[73] Assignee: GTE Valenite Corporation, Troy, Mich.

[ * ] Notice: The portion of the term of this patent subsequent to Nov. 10, 2004 has been disclaimed.

[21] Appl. No.: 85,840

[22] Filed: Aug. 17, 1987

[51] Int. Cl.$^4$ ............................................. B23B 27/16
[52] U.S. Cl. ..................................... 407/115; 407/114
[58] Field of Search ................. 407/62, 115, 116, 117, 407/113, 114, 24, 21, 61

[56] References Cited

U.S. PATENT DOCUMENTS

| | | | |
|---|---|---|---|
| 3,399,442 | 9/1968 | Jones et al. | 29/95 |
| 3,786,540 | 1/1974 | Lundgren | 29/95 |
| 3,786,541 | 1/1974 | Lundgren | 29/95 |
| 3,885,281 | 5/1975 | Stambler | 29/95 |
| 4,215,957 | 8/1980 | Holma et al. | 407/114 |
| 4,273,480 | 6/1981 | Shiral et al. | 407/114 |
| 4,281,430 | 8/1981 | Hellnick | 10/101 |
| 4,335,984 | 6/1982 | Zweekly | 407/114 |
| 4,531,863 | 7/1985 | Smith | 407/113 |
| 4,572,713 | 2/1986 | Schmidt | 407/114 |
| 4,606,678 | 8/1986 | Zweekly | 407/114 |
| 4,626,140 | 12/1986 | Zweekly et al. | 407/114 |
| 4,669,925 | 6/1987 | Lowe et al. | 407/114 |

Primary Examiner—Robert P. Olszewski
Assistant Examiner—Blynn Shideler
Attorney, Agent, or Firm—Robert E. Walter

[57] ABSTRACT

In a thread-cutting insert of the type having a plurality of teeth, each of the respective teeth of the insert includes a pair of scallops which intersect closely adjacent to the forward cutting edge of each tooth to form a ridge which tends to split a chip.

1 Claim, 2 Drawing Sheets

SCALLOPED THREADER CUTTING INSERT

BACKGROUND OF THE INVENTION

The present invention relates to thread cutting inserts which may be detachably mounted on a tool holder for cutting a workpiece. Cutting insets of this type are generally made of cemented metal carbide and are formed by pressing and sintering techniques.

In the type of cutting inserts referred to herein, it is desirable to have an indexable insert which presents a positive rake cutting edge to the working piece.

U.S. Pat. No. 3,885,281 to Stambler describes an insert having both longitudinally curved and transversally curved channels along the side edges of the insert meeting at the corners of the insert. At each corner of the insert, V-shaped shallow grooves are depressed into the merging portions of the deeper longitudinal channels to provide chip control for shallow depth cuts.

U.S. Pat. No. 3,786,541 to Lundgren relates to a cutting insert having chip breakers in two stages wherein the cutting edge and the associated chip breaker describe a curve of a particular description.

U.S. Pat. No. 3,786,540 describes an insert having chip control groove extending along a side surface. The width of the groove describes a compound curve such that the width varies along the length of the side.

U.S. Pat. No. 3,399,442 to Jones describes an insert having chip control groove along the entire outer edge comprising an inner and outer region. The outer region is concave in cross-section.

U.S. Pat. No. 4,335,984 to Zweekly describes an insert having a plurality of breaking depressions in the chip breaker surface adjacent to the cutting corner.

U.S. Pat. No. 4,273,480 describes a succession of chip control recesses formed on the cutting face at the outer periphery along the cutting edge. The chip control recesses are generally spherical and may intersect or contact each other as well as the cutting edge.

U.S. Pat. No. 4,215,957 discloses depressions which are generally rectangular with inner corners spaced from the cutting edge.

U.S. Pat. No. 4,281,430 to Hellnick relates to an apparatus for machining pipe collars having internally tapered coaxial threads with a thread cutting tool having first and second thread topping forming portions defined on opposite sides of the thread groove-forming tooth. U.S. Pat. No. 4,531,863 to Smith et al relates to a thread cutting apparatus having multiple thread cutting profiles.

U.S. Pat. No. 4,572,713 to Schmidt relates to a threading insert having a plurality of cutting teeth along an edge. The recesses between successive teeth become progressively deeper in a direction away from the intersection of the edges.

SUMMARY OF THE INVENTION

U.S. Pat. No. 4,606,678 to Zweekly, describes a circular chip breaking insert having a plurality of overlapping peripheral conical depressions extending to the cutting edge and including secondary conical depressions formed at the overlapping areas of the primary depressions.

In prior copending application Ser. No. 6/785,211, filed on Oct. 7, 1985, a circular chip control insert is disclosed employing peripheral scallops with chip breaking backwalls intersecting on ridges of diminishing height and terminating substantially at the peripheral cutting edge.

U.S. Pat. No. 4,669,925 to Lower et al, issued Jan. 31, 1987, there is described a special finishing threader which employs a chip breaking scallop principle that may be used to remove all or major portion of the thread stock in fewer passes than previously required.

In the present invention, the thread cutting insert has at least one cutting edge having a plurality of cutting teeth. A plurality of chip breaking scallops are positioned along the cutting edges and extend inwardly from the respective edge. Each scallop comprises a bottom surface terminating at a back surface to form a chip breaker. The bottom and back surfaces are formed as segments of conical frustum.

DETAILED DESCRIPTION OF THE DRAWINGS

DETAILED DESCRIPTION OF THE PREFERRED EMBODIMENT

Figure 2:
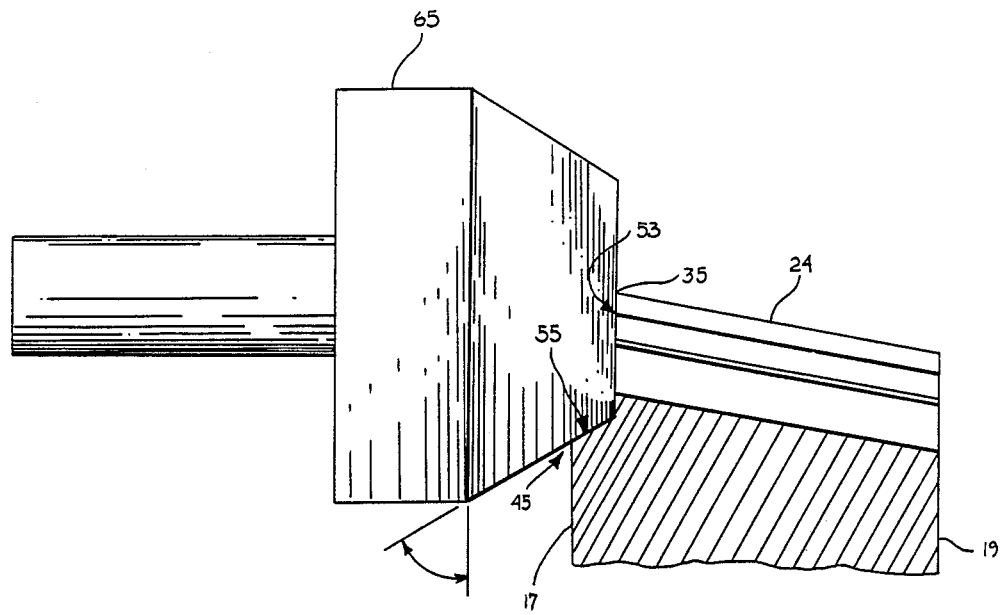
FIG. 2 is an enlarged fragmentary sectional view of a single scallop illustrating the grinder orientation for forming a master insert.
Figure 1:
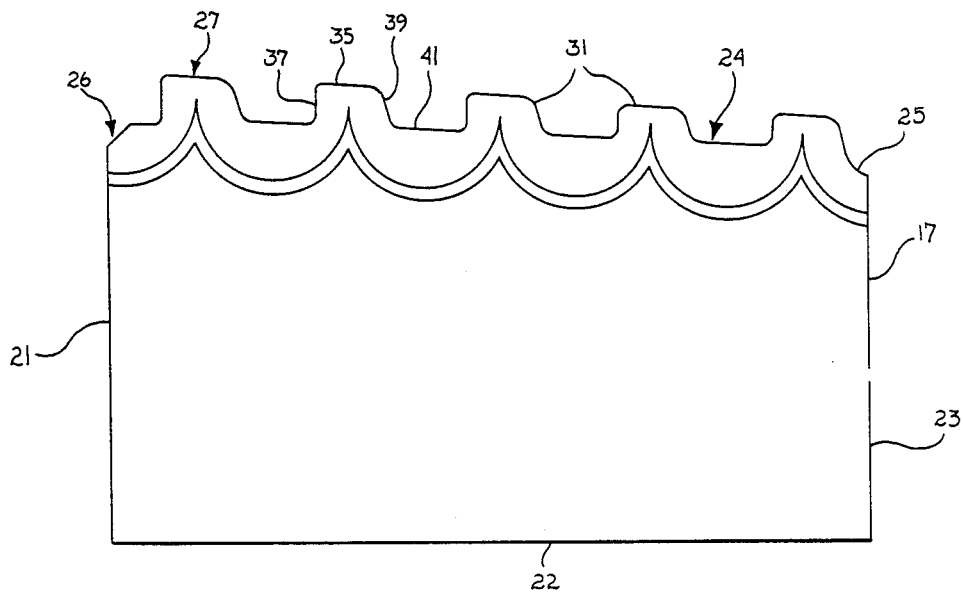
FIG. 1 is a plane view of a typical preferred embodiment of the multiple tooth cutting insert.

The cutting insert 15 has substantially parallel faces 17,19 with peripheral side surfaces 21–24 intermediate to the parallel faces 17,19. The faces 17,19 are joined with the side surfaces 21–24 to form eight corners at the junctions. Peripheral side surface or top surface 24 is shown at an angle with respect to face surfaces 17,19 while the remaining peripheral side surfaces 21–23 are normal to face surfaces 17,19. One corner 25 is at the juncture of face 17 and side surfaces 23. Corner 26 is similarly formed. A cutting edge 27 extends between corner 25 and corner 26.

The cutting edge 27 includes a plurality of teeth 31. Each of the teeth 31 includes an outwardly facing cutting edge 35 and a pair of side cutting edges 37,39. The side cutting edges 37,39 of successive teeth 31 are joined by a rearward edge 41. The teeth 31 are formed with a height which increases in a direction away from corner 25. This configuration results in successive cutting of a thread with chips of a controlled thickness. The final tooth adjacent corner 27 cuts the final thread configuration.

Figure 3:
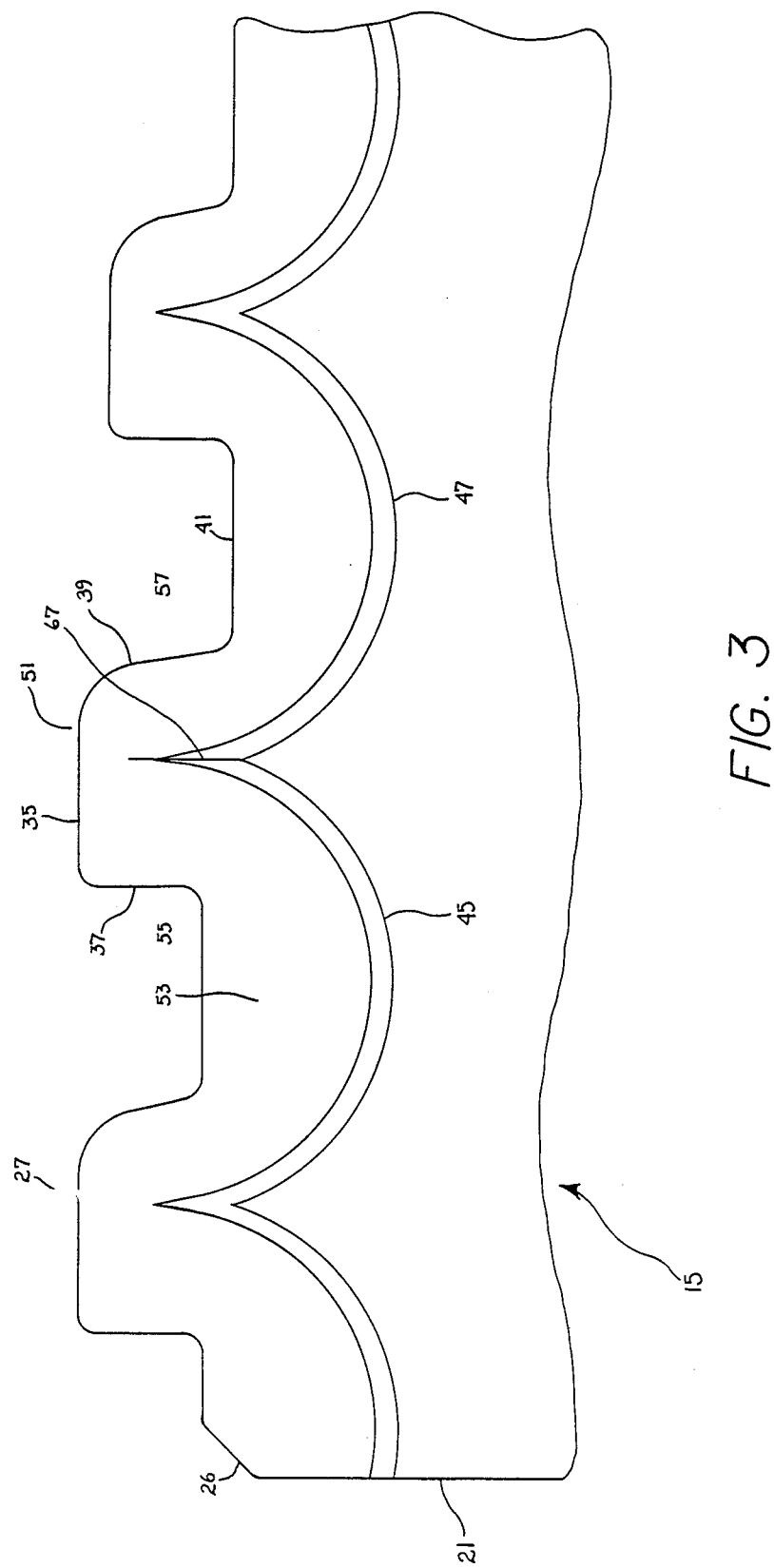
FIG. 3 is an enlarged fragmentary view of a portion of the cutting insert shown in FIG. 1.

As illustrated in detail in FIG. 3, a pair of intersecting scallops 45,47 are associated with tooth 51. Each of the scallops 45,47 has a planar bottom surface 53 and arcuate backwall 55 which intersects an adjacent backwall 57 at a location intermediate the side surfaces 37,39 or outward cutting edge 35 of respective teeth 31. The intersection of respective arcuate backwalls 55,57 is closely adjacent the outwardly facing cutting edge 35 of tooth 51. This configuration provides a wedge effect at the intersection of the backwalls 55,57 which tends to split a chip flowing off the cutting edge 27. Although the above description has been directed to a specific tooth 51 and associated scallops 45,47, the additional teeth 31 have similarly formed backwalls with similar intersecting locations.

The insert 15 as shown may be provided with a plurality of scallops. Preferably, the scallops are similarly formed and the following description of the formation of a single scallop 45 is applicable to the formation of other scallops. With reference to FIG. 2, the scallop 55 comprises a bottom surface 53 meeting at an angle with a top peripheral surface 24 resulting in a positive rake. The bottom surface 53 joins and terminates at the junction with back surface or backwall 55 which also is an arcuate surface. The bottom 53 and back 55 surfaces of scallop 45 are formed as segments of conical frustum.

Scallop 45 is formed in a manner as described in U.S. patent application Ser. No. 785,211 hereinbefore mentioned which disclosure is incorporated by reference into the present application. The form of a typical scallop 45 is established on a master by a grinding wheel 65 as shown in FIG. 2. From this view, it will be seen that the basic dimensions of the grinder or frustum 65 is such that presented with its end surface at a zero degree angle to the face 17 of the insert, a positive rake scallop surface 53 is formed together with a 60 degree angle of backwall 55 relative to the vertical axis of the insert. In the preferred embodiment as illustrated in FIG. 2, the top peripheral surface 24 forms an acute angle with the face 17 whereby a positive rake is formed when the bottom surface is parallel to the face 17. It is contemplated that other variations may be utilized to form a positive rake. The bottom surface 53 may be formed at an angle with respect to the face surface 17.

In accordance with the preferred embodiment of the present invention, scallop 45 and equivalent scallops are formed at a particular location in or on insert 15. The cutting face 17 of the insert 15 includes a pair of scallops positioned at each of the teeth 31. The bottom and back surfaces 53,55 of respective scallops are formed by the intersection of the outer surface of the grinder 65 with the insert 15. The grinder or frustum 35 has a frustro conical shape as previously referred to. In forming each scallop, the grinder or frustum 35 has an axis of symmetry or rotation substantially positioned in a plane normal to face 17. Preferably, each plane containing the axis of rotation is positioned at a location spaced from the center of respective teeth so that the backwall circumscribed by the grinding wheel 65 tends to bisect a respective tooth and form a ridge projecting inwardly from the cutting edge. Preferably, the bisector 67 equally divides a respective tooth. In forming each of the scallops 45,47, the frustum 65 has an axis positioned within a plane substantially parallel to the bisector 67 of a respective tooth 51. Each plane containing the axis is preferably parallel to the bisector and spaced from the bisector 39 a distance substantially equal the maximum radius of the frustum 65. With this configuration of the scallops 45,47, a ridge is formed along the bisector of respective teeth.

We claim:
1. A thread-cutting insert comprising a pair of parallel faces and a plurality of peripheral side surfaces extending therebetween,
   a plurality of outwardly projecting cutting teeth being formed by at least one peripheral surface intermediate said pair of parallel faces, each tooth comprises a forward cutting edge and a pair of side cutting edges whereby a plurality of said forward cutting edges and respective side edges form respective teeth, and a plurality of rearward edges for joining respective side cutting edges of successive teeth,
   a plurality of scallops, each scallop having a bottom surface extending rearwardly of a pair of adjacent forward cutting edges and an arcuate backwall extending upwardly from said bottom wall to one of said parallel faces whereby a respective arcuate backwall of one scallop intersects a respective arcuate back of an adjacent scallop at a position located at least partially on a cutting tooth closely adjacent said cutting edge for controlling the flow of chips away from the cutting edge, said peripheral side surface being at an acute angle with said bottom wall for forming a positive rake at said forward cutting edges.

* * * * *